United States Patent

Bravo

[11] Patent Number: 6,003,537
[45] Date of Patent: Dec. 21, 1999

[54] REMOVABLE PENETRATION FITTINGS USING T-FITTING AND FLEXIBLE PIPE COMBINATION

[76] Inventor: Sergio M. Bravo, 2872 Tigertail Dr., Los Alamitos, Calif. 90720

[21] Appl. No.: 08/936,331

[22] Filed: Sep. 24, 1997

Related U.S. Application Data

[63] Continuation-in-part of application No. 08/829,827, Mar. 25, 1997, Pat. No. 5,955,657, and application No. 29/077,027, Sep. 17, 1997, abandoned.

[51] Int. Cl.⁶ .............................. B67D 5/32; F16K 43/00
[52] U.S. Cl. .............................. 137/15; 73/46; 73/49.1; 137/312; 137/315; 141/383; 285/133.21; 285/133.4; 285/379
[58] Field of Search ........................... 137/15, 312, 315; 141/383; 285/133.11, 133.21, 133.3, 133.4, 133.5, 133.6, 379, 410, 412; 405/52, 53; 73/40.5 R, 46, 49.1; 138/104, 111, 114

[56] References Cited

U.S. PATENT DOCUMENTS

| | | | |
|---|---|---|---|
| 396,080 | 1/1889 | Gilliam | 285/133.4 |
| 1,811,501 | 6/1931 | Holmes | 285/133.4 |
| 3,490,796 | 1/1970 | Smith, Jr. | 285/412 |
| 3,721,270 | 3/1973 | Wittgenstein | 138/104 |
| 4,285,500 | 8/1981 | Illing et al. | 285/133.11 |
| 4,294,275 | 10/1981 | Totman | 137/15 |
| 4,428,603 | 1/1984 | Davlin | 285/412 |
| 4,842,163 | 6/1989 | Bravo | 137/312 |
| 4,971,225 | 11/1990 | Bravo | 137/312 |
| 4,971,477 | 11/1990 | Webb et al. | 405/154 |
| 5,027,665 | 7/1991 | Hayward | 285/236 X |
| 5,100,024 | 3/1992 | Bravo | 137/312 |
| 5,257,652 | 11/1993 | Lawrence | 141/86 |
| 5,285,829 | 2/1994 | Bravo | 141/88 |
| 5,341,857 | 8/1994 | Bravo | 141/88 |
| 5,366,318 | 11/1994 | Brancher | 285/192 X |
| 5,527,130 | 6/1996 | Webb | 405/52 |
| 5,529,098 | 6/1996 | Bravo | 141/88 |
| 5,590,981 | 1/1997 | Osborne | 405/154 |

FOREIGN PATENT DOCUMENTS

| | | | |
|---|---|---|---|
| 835239 | 3/1952 | Germany | 285/236 |
| 1066506 | 4/1967 | United Kingdom | 73/201 |

*Primary Examiner*—George L. Walton
*Attorney, Agent, or Firm*—Cislo & Thomas LLP; David L. Hoffman, Esq

[57] ABSTRACT

A T-fitting such as for use inside a containment box for connecting a primary pipeline to a gasoline dispenser has two flanges which connect to the pipeline and a main T-element sealed to each flange by a sealing element such as a gasket. The flanges thread onto each end of the primary pipeline. The main T-element has a stem which is threaded to a pipe leading to a gasoline dispenser. The flanges of the T-element are bolted to the main body of the T-element with the rubber gasket in between to seal the primary pipeline to the T-element.

20 Claims, 3 Drawing Sheets

REMOVABLE PENETRATION FITTINGS USING T-FITTING AND FLEXIBLE PIPE COMBINATION

CROSS-REFERENCE TO RELATED APPLICATIONS

This application is a continuation-in-part of U.S. patent application Ser. No. 09/829,827, filed Mar. 25, 1997, now U.S. Pat. No. 5,955,657. This application is also a continuation-in-part of U.S. Design patent application Ser. No. 29/077,027, filed Sep. 17, 1997, now abandoned.

BACKGROUND OF THE INVENTION

1. Field of the Invention

The present invention relates to a T-fitting with quick release flanges for gasoline handling equipment, and more particularly, to a T-fitting with quick release flanges for a primary pipeline connection to a gasoline dispenser for service stations with secondary containment pipes and a method for installing the T-fitting.

2. Background of the Invention

For some time now, gasoline handling equipment, such as gasoline dispensers, and the piping connecting such dispensers with underground gasoline tanks and pumps has been made with secondary containment. That is, due to environmental concerns favoring prevention of leaking gasoline from entering the ground, the pipes have a second pipe around them, and the dispensers and underground pump have a box-like structure below them. An example of such a box and secondary containment is shown in U.S. Pat. Nos. 5,285,829 and 5,341,857, both to the present inventor. Typically, for each product line, such as 87 octane, there is a separate pipeline. At the dispenser, there is an impact valve which will shut off the flow of gasoline to the dispenser in the event of a vehicle colliding with the gasoline dispenser or other disaster. The above-mentioned patents show that the impact valve may also be connected to a float mechanism for detecting leaking gasoline that is collected within the containment box. The lifting of the float mechanism will shut off the impact valve. In addition, in such systems, it is common to provide a light, bell, or other warning signal, including the shutting off of the dispenser itself, to alert the station attendant that there is a problem with that dispenser. The float system will also detect water and will operate in the same manner as in response to gasoline.

In such systems, it is customary to install the containment box. The box surrounds an impact valve which leads to the gasoline dispenser below which the box is installed. A primary pipeline (product line) will pass through the box carrying fuel from an underground storage tank to the gasoline dispenser above the box, and also to be carried to an additional dispenser. Accordingly, a T element is needed within the box to connect an input line of the primary pipeline to the line leading to the impact valve and dispenser (gasoline dispenser input line), while allowing product to continue on to the next dispenser through a product output line.

Once the box is installed, a T is connected to the line leading to the impact valve. The T must also be connected to the primary pipeline. This is a cumbersome connection to make and to remove and replace in the event of repairs. What is needed is a way to simplify installation of the T element and surrounding piping, and to simplify repair of the piping and/or T element after installation.

SUMMARY OF THE INVENTION

The present invention provides a T-fitting such as for use inside a containment box for connecting primary pipeline to a gasoline dispenser, the T-fitting having two flanges which connect to the pipeline and a main T element sealed to each flange by a sealing element such as a gasket. In a preferred embodiment, the flanges thread onto each end of the primary pipeline. The main T element has a stem which is threaded to a flexible pipeline leading to the gasoline dispenser. After threading the flanges, the main T element is held in alignment with the flanges, then the flanges are bolted to the main T element with a rubber gasket in between. Bolt holes in the T element are elongated. The main T element and the flanges have scores on their exteriors above the center of the bolt holes to enable them to be aligned.

To assist in threading the flanges into the primary pipe, there is a tool having a cross-shape and including a pin on each portion of the cross at 90° apart. The pins are inserted into the bolt holes on flanges and a handle of the tool is rotated to thread the flange.

To assist in centering the main T element, a tool having a long bar is dimensioned to extend to each side wall of the containment box. The tool has a pair of centering elements extending perpendicular to it and the stem of the main T element is positioned between them.

DESCRIPTION OF THE PREFERRED EMBODIMENT(S)

The apparatus and method of the invention are particularly applicable to a service station which has multiple dispenser islands. As is typical in service stations today and as in U.S. patent application Ser. No. 08/829,827, filed Mar. 25, 1997, incorporated by reference herein, each dispenser island may have three or more different types of dispensers, such as for 87 octane, 89 octane, 92 octane, and diesel fuel. Each dispenser sits on a concrete island and has a secondary containment box attached to its underside. The secondary containment box may be of a type such as in U.S. Pat. Nos. 4,971,225, 4,842,163, or 5,135,324, all to the present inventor, and all incorporated by reference herein. The boxes house impact valves where fuel from a primary pipeline passes through to each dispenser via a connecting pipe. As disclosed in the above-referenced three patents, each impact valve is connected by a chain-and-lever mechanism to a float located, preferably in a well formed in each box.

The primary pipeline, as is well known in the art, carries gasoline from an underground storage tank to the impact valves and is pressurized by a submersible pump. The pump is located in a sump box, which may be constructed similar to the containment boxes as it performs a similar leak collection function with an electronic shut down of the pump in response to a leak.

Figure 1:
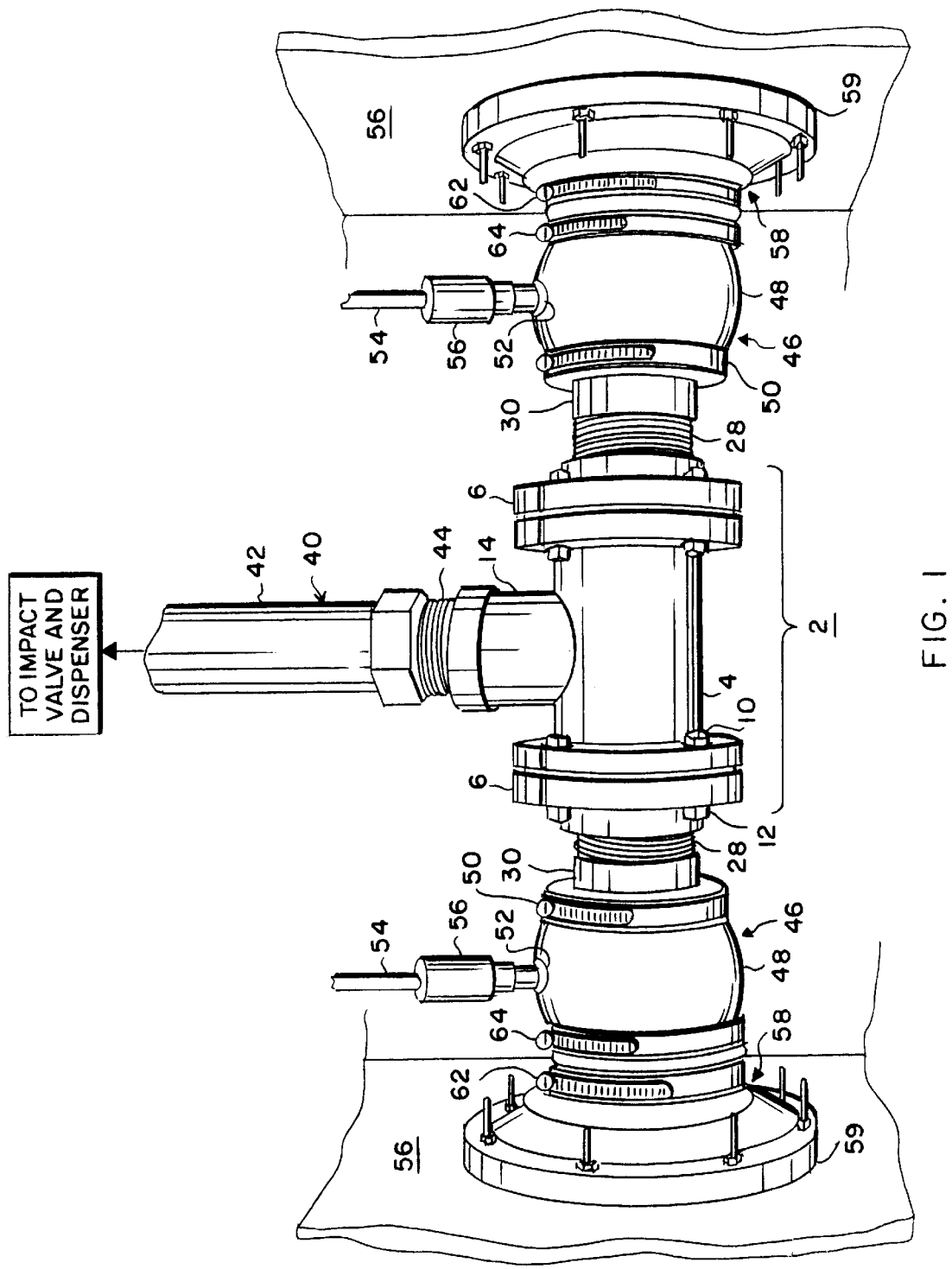
FIG. 1 is a slight perspective view of a T-element with its flanges connected to a product line and its stem connected to a pipe leading to a gasoline dispenser, the element being located within a containment box, according to the invention.

FIG. 1 shows a partial view of walls 56 of a containment box and structure therein including a T-fitting in accordance with a preferred embodiment of the invention. T-fitting 2 connects at its upper, stem portion 14 to a pipe 40 such as a flexible pipe having a flexible body 42 and a threaded end 44.

Each secondary pipe is sealed to containment box wall 56 by means of a flexible penetration fitting 58, such as in U.S. patent application Ser. No. 08/714,471, filed Sep. 16, 1996, by the subject inventor and entitled FLEXIBLE PENETRATION FITTING, and incorporated by reference herein. Each penetration fitting 58 may be identical. The secondary pipe is secured to a portion 60 of the fitting 58 by at least one of band clamps 62, 64 and glue or epoxy. Another flexible fitting 46 may be band clamped by clamp 50 to a primary pipe 30. A body 48 of the fitting 46 may then be secured to the end of the secondary pipe or the fitting 58 by epoxy or clamping or both. The body 48 has a threaded hole 52 for attachment of a coupling element 56 having a tube 54 connected thereto. This hole 52 in body 48 will be used in the same way as in U.S. patent application Ser. No. 08/829,827 mentioned above, for detecting leaks in and testing the secondary line.

Figure 2:
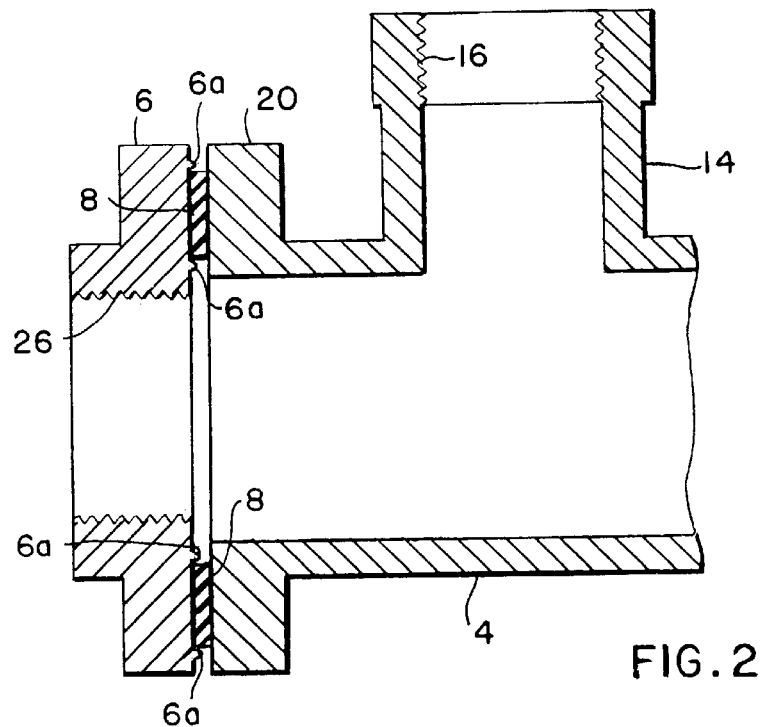
FIG. 2 is a partial vertical sectional view of the T-element showing connection of a flange to a left side thereof, the element being symmetrical at left and right sides thereof.
Figure 6:
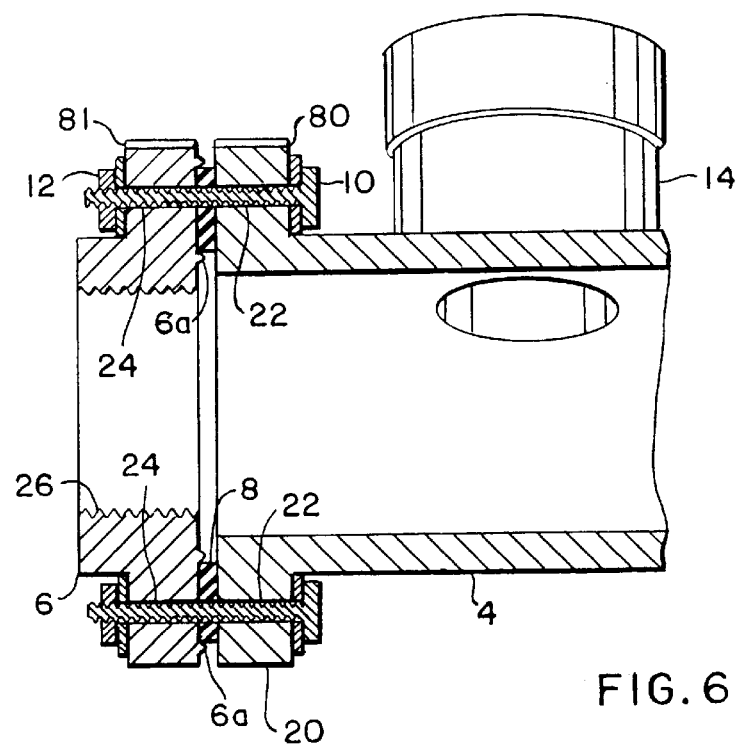
FIG. 6 is a view similar to FIG. 2 but the section is taken at 45° to the vertical section of FIG. 2.

With reference to the vertical section, FIG. 2, and FIG. 6 which is identical thereto but at 45°, main T body 4 has stem 14 with internal threads 16 for connection to the pipe leading to the impact valve. Two flanges 6 connect to each opposing end of main body 4 with a rubber gasket 8 therebetween. The opposing ends of the main body 4 have externally directed annular, planar lips 20 with bolt holes 22 preferably located at every 90°. In the embodiment shown, the bolt holes are preferably offset by 45° from horizontal and vertical orientations.

A bolt 10 and a nut 12 fasten the lip 20 to the flanges 6 via bolt holes 22, 24. The internal threads 26 of the flanges 6 allow the flanges to be threaded onto the external threads 28 of the primary pipe 30.

To install the piping and T, and fittings in the field, the following procedure may be used. An appropriate area below each dispenser island is excavated and containment boxes are installed. Fittings 58 and 46 may be made in one piece (or separately) and attached at flat portion 59 to the inner wall of the containment box 56, as shown in FIG. 1. This may be done before or after installation of the box in the field. It is preferable to start the installation with an end box, i.e., a containment box where the primary pipeline and secondary pipeline terminate. The user measures from the face of the 90° or elbow fitting used in the end box where the primary pipeline is to be connected to the face of the flange of the T-fitting. (For example, fitting 6 on the right in FIG. 1). This gives the length of the primary pipeline, which may be fiberglass pipe formed in solid pieces and made, e.g., by A. O. Smith or Ameron. The secondary pipeline is cut to a length corresponding to the distance between the end box and the next containment box (at wall 56 in FIG. 1), then add a sufficient amount for the secondary pipe to extend approximately one inch beyond the flexible penetration fitting 59 attached to wall 56 and one inch beyond the same fitting which would be used inside the wall of the end containment box. To facilitate sliding and rotating the primary pipe within the secondary pipe for purposes of performing the connection, and to help maintain the primary pipe centered in the secondary pipe, a C-clamp or equivalent centering device is used. Such a C-clamp would be formed, for example, by a C-shaped portion of preferably somewhat greater than 180° of a hard plastic, and having radial protrusions, e.g., about 90° apart, which contact the inside of the secondary pipe. The material should be fairly hard and compatible with a gasoline environment, but have sufficient flexibility so that the C can be formed with a diameter slightly smaller than that of the exterior of the primary pipe, and thereby clamp or press fit over the primary pipe. Multiple C members in multiple orientations around the primary pipe should be used.

Prior to connecting the secondary and primary pipe at the end box, the remote ends of the primary and secondary pipe should be slid into the box adjacent the end box. This will provide room to then slid the mirror ends of the primary and secondary pipes into the end box. The primary pipe can be then threaded into the end of the elbow in the end box. The C-members allow the primary pipeline to be rotated within the secondary pipeline to perform this threading. The secondary pipe may then be slid into position one inch inside the penetration fitting attached to the inside of the end box. The reducer cap or fitting assembly 46 should be slid over the end of the primary and secondary pipe before connecting the primary pipe in the end box.

To determine the length to cut the pipe, use the centering tool 90 to center the T which has been first connected to the flexible pipeline 42. The distance from the center of the box to the position where the primary pipeline is to be connected in the end box would then have the distance from the center of the T to the face of the flange deducted from it to obtain the length to cut the primary pipe. For the next box or next primary pipe section, the distance between center of each box is measured and one would deduct the length from the center of one T fitting to the end face of the flange multiplied by two to represent this distance in each box.

Once the end box is fully connected, the right-side connections in the next adjacent box, the box of FIG. 1 in keeping with our example, would be connected. Before connecting, as in the end box, the fitting assembly or reducer fitting 46 is slid over the primary pipe. The secondary pipe may at this time be connected to the fitting 59. The right flange 6 is threaded to the end of the primary pipeline. The through-holes in the fitting 6 are aligned using the alignment marks with the through-holes in the main body 4 of the T. The flexibility of the pipe 40 is helpful in this regard. The rubber gasket 6a is placed between the flange 6 and end 20 of the main body, and the bolts 10 and nuts 12 are tightened.

The placement of the primary and secondary pipes located on the left side of the box in FIG. 1 is essentially the same. First, these pipes are slid into the next adjacent box to a sufficient extent to allow them to be slid into the left end of box 56. Then, the fitting 46 is slid over the primary pipe. The flexible penetration fitting 58, previously attached to the wall 56 of the box, is then tightened to the secondary pipe, which would extend approximately one inch the end of the penetration fitting. The fitting 46, after pipe 30 positioned, is tightened. Glue ("pipe dope") may be used on the primary and secondary pipeline connection to the fittings.

The left flange 6 is then threaded to the primary pipe. The pipe, which is still freely rotatable within the secondary pipe, is then rotated so as to the align the end flange 6 through-holes with the through-holes in the end face of the main T. The rubber gasket is placed in position and the end flange and end face are bolted together. The fitting 46 may then be tightened to the primary and second pipelines. Connection of the primary and secondary pipes, fittings, and T member for each adjacent box continues in the same way.

Figure 3:
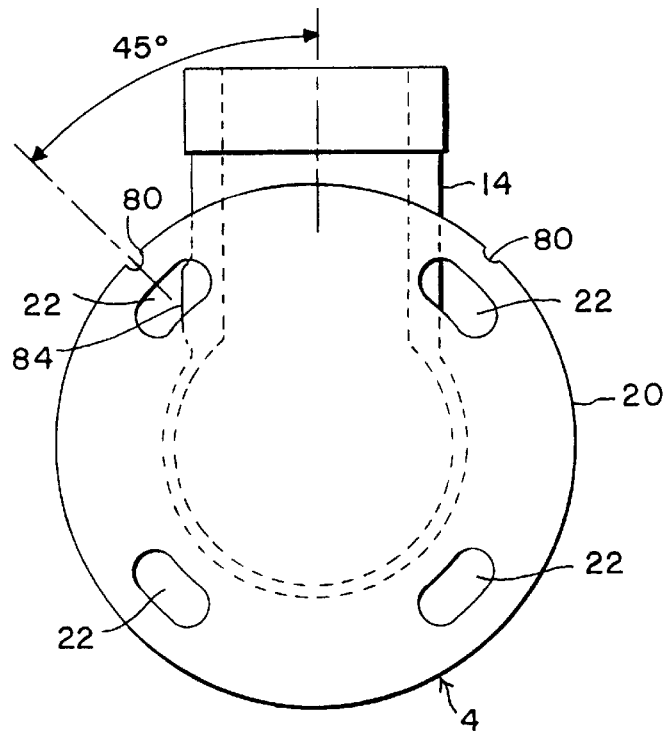
FIG. 3 is an end view of a main body of the T-element.
Figure 4:
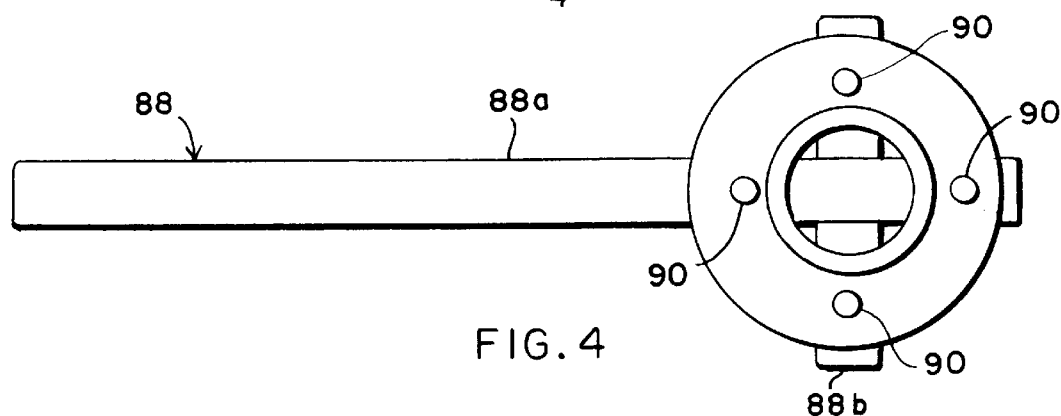
FIG. 4 is an end view of a flange of the T-element engaged by a wrenching tool.

To thread the flanges 6 of the T-member onto each primary pipe, and tighten them, the wrenching tool 88 of FIG. 4 is useful. The tool includes a handle 88a and cross-portions 88b. On each cross-portion and the handle at 90° apart to match the spacing of the holes 24, pins 90 are located. These pins 90 are positioned to enter the holes 24 in the flange member. The flanges are tightened, preferably with their scoring 80 located approximately 45° from the vertical. The rubber gasket 8 is positioned in between concentric projections 6a of the flanges 6. The main body 4 is then positioned with its scoring 80 substantially in alignment with the scoring 81 on the flanges. The screw holes 22 in the main body are preferably elongated, as shown in FIG. 3, so that alignment need not be exact with the holes 24 in the flanges.

Figure 5:
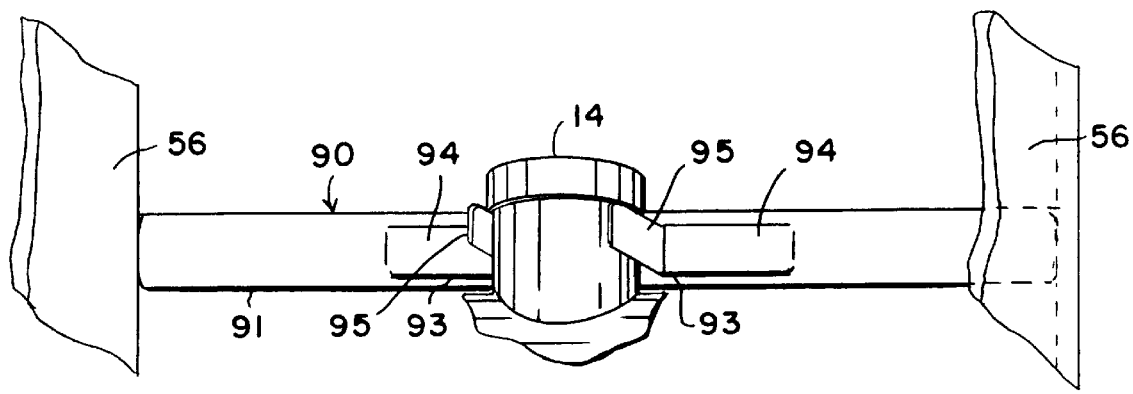
FIG. 5 is a slight perspective view of a stem portion of the main body and a centering tool extending between side walls of the containment box and engaging the stem.

The details of use of the centering tool at FIG. 5 will now be described. Before gluing and sealing the primary and secondary pipes to the fittings, the main T-member may be centered as shown in FIG. 5 using a centering tool 90. The tool has an elongate bar 91 dimensioned to extend between the side walls 56 of the containment box and having angle elements 93 fixed to it at their legs 94. Legs 95 project perpendicular from the bar 91 and are at a distance apart slightly larger than the radius of stem 14 of the main body 4 of the T. This centers or substantially centers the T-element and the final positioning of the secondary and primary pipes may be done at this point so that the flanges 6 will be an appropriate distance from the T main body 4. The primary and secondary pipes may then be fine positioned and epoxied and/or clamped to the fittings. The flanges 6 are then bolted to the main body of the T to seal it.

The T may be removed and later replaced for repairs or the like by unfastening the bolts and nuts, sliding the T out laterally, and then effecting the necessary repairs. The T may then be slid back into position and the bolts tightened again.

Another important feature of the present invention is that if the boot of a penetration fitting were to crack or tear, a new boot can be installed without excavating the ground around the containment box. First the primary pipeline is disconnected from the equipment inside the containment box. Then the nuts and compression ring are removed from the penetration fitting. The damaged boot is removed and a new boot is placed over the pipeline such that the holes in the sealing flange fit over the studs of the existing backing ring. The compression ring and nuts are then reinstalled to seal the new boot against the wall of the containment box. There is generally no need to replace the gasket. A hose clamp is placed around the sleeve and tightened to seal the boot to the pipeline. The primary pipeline can then be reconnected to the equipment in the box with minimal downtime. Such a simple method for replacing a boot is impossible with prior art penetration fittings which are installed from the outside of the box.

Therefore, for repairs such as replacing a damaged gasket, the T-fitting is removed as described above, as the step of disconnecting the primary pipeline.

As noted above, the scoring is preferably located at about 45° from the vertical. On the main body of the T, there would be two scores 80 above the upper bolt holes. On the flange, there may be two or four scores 81 or other appropriate number at each bolt hole.

As shown in FIG. 3, the stem 14 of the T has a thickened area 84 (which would be at the rear of the T in FIG. 1). This thickened area 84 is for having a threaded hole formed therein. A normally closed valve may be threaded into the hole 86 to allow for pressure testing of the T and primary pipeline.

It is understood by those skilled in the art that changes in the form and detail of the above-described embodiments may be made without departing from the spirit of the invention. For example, the positioning or amount of the scoring may be changed. The T-member may be made out of PVC, brass, or other suitable material, depending upon the environmental conditions. The primary pipeline may be flexible or rigid and the piping leading to the impact valve may be flexible or rigid.

What I claim is:

1. A flammable fluids handling system for containing leaks in piping located below a flammable fluids dispenser, the system comprising:

a containment box having an inlet opening and an outlet opening in its walls;

a flammable fluids supply pipeline having a primary pipeline for carrying flammable fluid disposed inside a secondary pipeline;

an extension pipe for communicating with the dispenser;

a T-member comprising a main body having an inlet opening, an outlet opening, and a stem having means for connecting to the extension pipe, a first flange removably fixed to the primary pipeline and a second flange removably fixed to the primary pipeline, a first seal member for sealing the first flange to the main body at the inlet opening of the main body and a second seal member for sealing the second flange to the main body at the outlet opening of the main body, and means for fixing the first and second seal members to the flanges and the main body at the inlet and outlet openings, respectively, whereby the flammable fluids supply pipeline will be carrying fluid through the containment box and will be communicated with the flammable fluids dispenser, and wherein the means for fixing releasably fixes the first and second seal members to the flanges and the main body; and a pair of penetration fittings disposed around the supply pipeline for sealing the supply pipeline to each wall of the containment box around the inlet opening and the outlet opening of the containment box, wherein the stem of the T-member is connected to the extension pipe by the means for connecting, there are means for attaching each penetration fitting to the walls of the containment box inside the containment box, the T-member being located between the penetration fittings, and wherein in response to releasing the means for fixing and removing the at least one of the first and second flanges from the primary pipeline, the penetration fitting may be removed and replaced.

2. The system of claim 1 wherein the T-member main body is internally threaded at the stem.

3. The system of claim 1 wherein the flanges are internally threaded for connection to the primary pipeline.

4. The system of claim 1 wherein the means for fixing comprises bolts and through-holes formed in the main body and flanges, and alignment marks for aligning the holes in the main body with the holes in the flanges.

5. The system of claim 1 wherein the member for sealing comprises a rubber ring for each flange, and each flange has concentrically formed projections for defining a space for receiving each rubber ring.

6. The system of claim 4 wherein the through-holes in the main body are elongated with respect to the through-holes in the flanges for providing alignment slack.

7. The system of claim 1 wherein the means for attaching comprises means for releasably fixing the penetration fitting to an inside surface of the wall of the containment box, wherein the means for releasably fixing is releasable from inside the containment box.

8. The system of claim 1, wherein the extension pipe comprises a flexible pipe.

9. The system of claim 1, wherein the means for releasably attaching comprises a pair of containment box flanges, bolts extending through the box and containment box flanges from outside the box, and nuts around the bolts inside the box.

10. A method of disconnecting and connecting a product input line with a gasoline dispenser and a product output line within a gasoline containment box using a T-assembly having a main body and first and second flanges, for removing and replacing penetration fittings for sealing the product input line and product output line to the box, wherein the box has an inlet opening and an outlet opening in its walls and the product input line and product output line passing therethrough, the penetration fittings being releasably attached to the inside walls of the box by means for attaching including gasoline containment box flanges, and the T-assembly being located between the penetration fittings, the method comprising the steps of:

(a) providing the input product line such that it has a free end extending through the inlet opening of the box and into one side of the box;

(b) fixing the first flange of the T-assembly to the free end of the input product line inside the box;

(c) positioning an end of the output product line extending into the box through the output opening of the box a predetermined distance from the free end of the input product line;

(d) fixing the second flange of the T-assembly to the end of the output product line inside the box;

(e) connecting a gasoline dispenser input line to a stem of the main body of the T-assembly;

(f) positioning first and second ends of the main body of the T-assembly between the containment box flanges and the first and second flanges of the T-assembly and in alignment with the first and second flanges of the T-assembly, respectively; and (g) releasably connecting the ends of the main body of the T-assembly to the first and second flanges, respectively, (h) whereby the T-assembly may be disconnected from and reconnected to the input and output product lines by disconnecting and reconnecting the ends of the main body of the T-assembly to the first and second flanges, respectively; and the method further comprising the steps of:

(i) disconnecting the ends of the main body of the T-assembly from the first and second flanges;

(j) removing at least one of the first and second flanges from the input product line and the output product line;

(k) removing at least one of the penetration fittings from the input product line and the output product line;

(l) replacing the removed penetration fitting by sliding a new penetration fitting over at least one of the input product line and the output product line; and reattaching at least one of the first and second flanges and reconnecting the ends of the main body of the T-assembly to the first and second flanges.

11. The method of claim 10 wherein prior to the step of releasably connecting the ends of the main body of the T-assembly to the first and second flanges, there is a step of placing a gasket between the first and second ends of the main body and the first and second flanges, respectively, and in the step of releasably connecting, the gasket is releasably connected between the ends of the main body and the first and second flanges.

12. The method of claim 10 wherein the step of releasably connecting further comprises clamping the ends of the first and second flanges to the first and second ends of the main body, respectively.

13. The method of claim 10 wherein there are a plurality of through-holes in the periphery of the first and second flanges and a plurality of through-holes in the periphery of the first and second ends of the main body, and the step of releasably connecting comprises a step of bolting the periphery of each of the flanges to the periphery of each of the first and second ends of the main body using the through-holes.

14. The method of claim 13 wherein in the step of positioning the first and second ends of the main body in alignment with the first and second flanges, the through-holes in the periphery of the flanges are aligned with the through-holes in the periphery of the first and second ends of the main body.

15. The method of claim 14 wherein the aligning is performed using alignment markings on the first and second ends and on the first and second flanges.

16. The method of claim 10 wherein in the step of connecting the gasoline dispenser input line to the stem of the main body, the gasoline dispenser input line is a flexible pipe and the gasoline dispenser input line is flexed.

17. The method of claim 10 wherein the steps of fixing the flanges, the flanges are threaded to the input product line and output product line.

18. The method of claim 10 wherein the means for attaching further comprises means for releasably fixing the penetration fittings to an inside surface of the wall of the containment box, and the step (k) of removing the at least one of the penetration fittings comprises a step of releasing the means for releasably fixing from inside of the containment box.

19. The method of claim 10, wherein the gasoline dispenser input line comprises a flexible pipe, and the method further comprises a step of bending the flexible pipe to perform the step (k) of removing.

20. The method of claim 10, wherein the means for attaching further includes bolts extending through the gasoline containment box from the outside to releasably connect the penetration fitting by the containment box flanges to the containment box, and nuts to fasten the bolts inside the box, and wherein in the step (k) of removing the at least one of the penetration fittings, the nuts are removed from inside the box.

* * * * *